US012663077B2

(12) United States Patent
Nerriere

(10) Patent No.: US 12,663,077 B2
(45) Date of Patent: Jun. 23, 2026

(54) BLOCKING MECHANISM

(71) Applicant: VALEO EMBRAYAGES, Amiens (FR)

(72) Inventor: Adrien Nerriere, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/939,106

(22) Filed: Nov. 6, 2024

(65) Prior Publication Data

US 2025/0146570 A1 May 8, 2025

(30) Foreign Application Priority Data

Nov. 7, 2023 (FR) ...................................... 2312094

(51) Int. Cl.
F16H 63/34 (2006.01)

(52) U.S. Cl.
CPC ..... F16H 63/3425 (2013.01); F16H 63/3466 (2013.01)

(58) Field of Classification Search
CPC ... F16H 63/3425; F16H 63/3466; F16H 63/38
See application file for complete search history.

(56) References Cited

U.S. PATENT DOCUMENTS

2013/0087427 A1* 4/2013 Kato ........................ B60T 1/005
192/219.4

2016/0025214 A1* 1/2016 Yoshida .................. F16H 63/48
701/45
2018/0112774 A1 4/2018 Littlefield et al.
2022/0381341 A1 12/2022 Ziemba

FOREIGN PATENT DOCUMENTS

DE 10 2007 007 681 A1 8/2008
DE 10 2020 213 568 A1 5/2022
KR 10-2010-0077493 A 7/2010

OTHER PUBLICATIONS

Preliminary French Search Report issued May 30, 2024 in French Application 2312094 filed on Nov. 7, 2023, 12 pages (with English Translation of Categories of Cited Documents & Written Opinion).

* cited by examiner

*Primary Examiner* — Lori Wu
(74) *Attorney, Agent, or Firm* — Oblon, McClelland, Maier & Neustadt, L.L.P.

(57) ABSTRACT

A blocking mechanism includes a mobile pawl mounted with the ability to pivot between a locking position and a release position. The mobile pawl includes a cam surface, a pushing device including a cam follower able to move on the cam surface in order to move the mobile pawl from the release position to the locking position, and an actuating lever moving the pushing device and including a first notch and a second notch. A positioning member engages in the first notch in the locking position and in the second notch in the release position. The positioning member includes a first fixing surface and a second fixing surface which are offset from one another axially.

20 Claims, 4 Drawing Sheets

3

303

302

300    301

BLOCKING MECHANISM

TECHNICAL FIELD

The present invention relates to a blocking mechanism for rotationally blocking a shaft of a drivetrain of a mobility apparatus, such as a motor vehicle for example.

TECHNOLOGICAL BACKGROUND

Blocking mechanisms are used, for example, as a parking brake for securing a stationary motor vehicle. In such a case, they make it possible to rotationally block a transmission shaft of the motor vehicle. Such blocking mechanisms are in particular used in motor vehicles with automatic transmission, in hybrid vehicles or electric vehicles.

Blocking mechanisms comprising a mobile pawl equipped with a locking finger mounted on a transmission casing with the ability to pivot between a release position and a locking position in which the locking finger is inserted in a locking recess secured to, in order to rotate as one with, the transmission shaft that is to be blocked, are known, notably from document US2018/0112774. The blocking mechanism further comprises a pushing device translationally guided on the transmission casing and including a cam follower which collaborates with a cam surface of the pawl so that a translational movement of the pushing device causes the pawl to pivot between the release position and the locking position.

An actuating lever allows the pushing device to be made to move. The actuating lever is pivotably mounted on the transmission casing and is directly or indirectly made to rotate by the rotor shaft of an electric motor.

Usually, the actuating lever comprises an external periphery having a first and a second angular-positioning notch. A positioning member fixed to the transmission casing comprises an elastic device, for example in the form of a flexible blade, pressing against the external periphery of the actuating lever. The positioning member is configured to engage in the first angular-positioning notch when the mobile pawl is in the locking position, and in the second angular-positioning notch when the mobile pawl is in the release position.

The positioning member thus enables the position of the blocking mechanism to be maintained stably and precisely in the release position and/or in the locking position.

Such a blocking-mechanism structure does present a number of technical problems:

Firstly, the compactness needs to be improved so that the blocking mechanism can be housed in the very restricted spaces allotted in recent transmissions, notably electric vehicle transmissions.

Secondly, the assembly needs to be simplified. In particular, the various components of the blocking mechanism may be fixed to the transmission casing along axes of fixing that are not mutually parallel, and this means that these need to be assembled in a plurality of complex operations.

Finally, these improvements to the compactness and assembly need to be able to be obtained while maintaining sufficient mechanical strength in the positioning member which is subjected to the mechanical loadings that arise during the phases, enabled by the blocking mechanism, in which the vehicle is held stationary.

SUMMARY

Hereinafter, ordinal numerical adjectives are used to distinguish between features. They do not define the position of a feature. Consequently, for example, a third feature of a product does not mean that the product has a first and/or a second feature.

One idea forming the basis of the invention is a blocking mechanism for rotationally blocking a shaft of a vehicle.

One idea forming the basis of the invention is a blocking mechanism which makes it possible to solve one or more technical problems encountered in the prior art, for example the aforementioned problems.

The invention relates to a blocking mechanism able to be mounted in a transmission casing for rotationally blocking a shaft of a vehicle having at least one locking recess, the blocking mechanism comprising:

a mobile pawl comprising a locking finger, the mobile pawl being mounted with the ability to pivot about an axis of pivoting between a locking position in which the locking finger is engaged in the locking recess and a release position in which the locking finger is disengaged from said locking recess, the mobile pawl comprising a cam surface;

a pushing device including a cam follower able to move on the cam surface in order to move the mobile pawl from the release position to the locking position;

an actuating lever mounted with the ability to pivot about an axis of actuation and configured to move the pushing device, the actuating lever comprising an external periphery including a first angular-positioning notch and a second angular-positioning notch; and a positioning member collaborating with the external periphery of the actuating lever, the positioning member including a bearing surface configured to engage in the first angular-positioning notch when the mobile pawl is in the locking position and in the second angular-positioning notch when the mobile pawl is in the release position;

the positioning member comprising a first fixing surface and a second fixing surface, the first fixing surface and the second fixing surface being offset from one another in a direction parallel to the axis of actuation.

According to another aspect of the invention, the invention relates to a blocking mechanism able to be mounted in a transmission casing for rotationally blocking a shaft of a vehicle having at least one locking recess, the blocking mechanism comprising:

a mobile pawl comprising a locking finger, the mobile pawl being able to be mounted on the transmission casing with the ability to pivot about an axis of pivoting between a locking position in which the locking finger is engaged in the locking recess and a release position in which the locking finger is disengaged from said locking recess, the mobile pawl comprising a cam surface;

a pushing device including a cam follower able to move on the cam surface in order to move the mobile pawl from the release position to the locking position;

an actuating lever able to be mounted on the transmission casing with the ability to pivot about an axis of actuation and being configured to move the pushing device, the actuating lever comprising an external periphery including a first angular-positioning notch and a second angular-positioning notch; and a positioning member collaborating with the external periphery of the actuating lever, the positioning member including a bearing surface configured to engage in the first angular-positioning notch when the mobile pawl is in the locking position and in the second angular-positioning notch when the mobile pawl is in the release position;

the positioning member comprising a first fixing surface and a second fixing surface, which surfaces are able to be fixed on the transmission casing, the first fixing surface and the second fixing surface being offset from one another in a direction parallel to the axis of actuation.

Within the meaning of the present application:

"axially" means "parallel to the axis of actuation";

"radially" means "along an axis belonging to a plane orthogonal to the axis of actuation and intersecting this axis of actuation";

"angularly" or "circumferentially" means "about the axis of actuation";

the terms "outer" and "inner" are used to define the position of one component relative to another, with respect to the axis of rotation, with which it is concentric; a component near said axis is thus described as inner as opposed to an outer component situated radially towards the periphery;

two components are said to be "fixed" or "rigidly secured" when they are permanently immobilized one with respect to the other, it being possible for this immobilization to be the result of the first component being fixed to the second component either directly or via one or more intermediate components.

Because of the architecture according to the invention, the actuating lever and the positioning member are assembled along axes that are parallel. They may therefore easily be mounted together during the same assembly operation. The axial offsetting of the first fixing surface with respect to the second fixing surface simplifies the assembly of the positioning member so that this is done sequentially, a first stage involving pre-positioning via the first fixing surface, the first fixing surface having, for example, a hole to fit onto a centring pin that is fixed to the transmission casing, then a second stage involving complete immobilization via the second fixing surface, for example by means of a screw connecting the second fixing surface to the transmission casing.

According to an additional feature of the invention, the first fixing surface and the second fixing surface are substantially parallel.

According to an additional feature of the invention, the first fixing surface and the second fixing surface are substantially perpendicular to the axis of actuation.

Because of these last two features, the fixing of the first fixing surface and of the second fixing surface may be accomplished using a suitable fixing means moving along the one same axis parallel to the axis of actuation, thereby simplifying the positioning and assembly of the positioning member on the transmission casing.

According to an additional feature of the invention, the first fixing surface and the second fixing surface are substantially planar.

According to an additional feature of the invention, the first fixing surface and the second fixing surface are distinct surfaces.

According to one additional feature of the invention, the axis of actuation of the actuating lever is parallel to the axis of pivoting of the mobile pawl.

Because of this feature, the assembly may be simplified still further because all of the components of the blocking mechanism that are intended to be mounted on the transmission casing can be mounted along axes that are parallel and can therefore all be mounted during the one same assembly operation.

According to one additional feature of the invention, the external periphery of the actuating lever is made up of surfaces parallel to the axis of actuation.

According to an additional feature of the invention, the actuating lever is formed from a plate cut from a sheet of constant thickness, the external periphery of the actuating lever being obtained from a cut edge face of the plate.

Thus, the actuating lever may be produced using a manufacturing process that is simple and economical.

According to one additional feature of the invention, the positioning member comprises a flexible blade directly or indirectly applying force to the external periphery of the actuating lever.

The flexible blade is a simple and economical solution that enables easy determination of a geometry compatible with a restricted amount of available space while at the same time providing enough mechanical strength and stiffness to hold the blocking mechanism in position.

According to an additional feature of the invention, the flexible blade deforms elastically and/or radially as it moves over the external periphery of the actuating lever.

According to an additional feature of the invention, the positioning member comprises a rolling element arranged on the flexible blade, the rolling element being configured to roll along the external periphery of the actuating lever.

The rolling element makes it possible to improve the durability of the blocking mechanism by limiting wear and friction between the external periphery of the actuating lever and the flexible blade.

Advantageously, the rolling element may be a cylindrical roller. A complementing shape may then be formed on the end of the flexible blade in order to constitute a pivot connection between the cylindrical roller and the flexible blade.

According to an additional feature of the invention, the first fixing surface and the second fixing surface are produced in the form of a first bent tab and of a second bent tab, the first and second bent tabs being bent at an angle of 90° from a first portion of the flexible blade and positioned axially one on each side of said first portion of the flexible blade.

Because of this last feature, the flexible blade has a fixing zone on each side of its flexing portion, and this has the effect of evenly distributing the absorption of load in the flexible blade and thus of reducing the mechanical stress in said blade.

According to an additional feature of the invention, the first bent tab is bent in an opposite direction to the second bent tab.

This last feature ensures that the first bent tab is not axially facing the second bent tab. Thus, the first bent tab does not impede the passage of a fixing tool for accessing the second bent tab, and vice versa. Access to the first and second bent tabs for fixing the positioning member is thereby simplified.

According to an additional feature of the invention, the blocking mechanism comprises:

a first fixing means, notably a centring pin, collaborating with the first fixing surface in order to block the movement of the positioning member in a plane perpendicular to the axis of actuation; and a second fixing means, notably a screw, collaborating with the second fixing surface to block the movement of the positioning member along an axis parallel to the axis of actuation.

The fixing of the positioning member in accordance with this last feature may be achieved with respect to any type of component on which the blocking mechanism may be mounted, notably the transmission casing.

Thus, the fixing of the positioning member is statically determinate. In other words, all the degrees of freedom of movement of the positioning member are blocked, while at the same time ensuring easy assembly free of the risk of deforming any components.

According to an additional feature of the invention, the first fixing surface comprises a first cutout, preferably circular, configured to be centred and fitted on a centring pin, a first diametral clearance being defined between the circular cutout and the centring pin, the first diametral clearance preferably being comprised between 0.05 mm and 0.2 mm.

According to an additional feature of the invention, the second fixing surface comprises a second cutout, preferably circular, configured to collaborate with the body of a screw, a second diametral clearance being defined between the second cutout and the body of the screw, the second diametral clearance being greater than the first diametral clearance, the second diametral clearance preferably being greater than 0.5 mm.

Because of this last feature, the risk of assembly being impossible because of the manufacturing tolerances on the components is eliminated.

According to an additional feature of the invention, the positioning member is fixed on the transmission casing.

According to an additional feature of the invention, the actuating lever is pivotally mounted on the transmission casing.

According to an additional feature of the invention, the mobile pawl is pivotally mounted on the transmission casing.

According to an additional feature of the invention, the transmission casing comprises bearing surfaces positioned, as a result of complementing shapes, facing the first and second fixing surfaces of the positioning member.

According to an additional feature of the invention, the flexible blade has a shape configured to leave unobstructed a passage along an axis parallel to the axis of actuation to allow the first and second fixing means to be assembled.

This last feature makes it possible to define the overall shape of the flexible blade such that no part thereof impedes the passage of a fixing tool. Access to the first and second fixing surface for fixing the positioning member is thereby simplified.

According to an additional feature of the invention, the flexible blade has a shape that is bent over on itself to form a V-shape.

What is meant by V-shape is that the flexible blade when viewed in profile has substantially the shape of an upper-case letter V, the shape of the upper-case letter V comprising two branches inclined with respect to one another by an angle comprised between 0° and 80°, the intersection of the two branches being pointed or radiused.

The V-shape makes it possible to obtain, in a restricted available volume, a flexible blade that has a flexing part of great length. By comparison with flexible blades of the prior art that have a flat or only slightly bent flexing part, the V-shaped blade may make it possible to obtain equivalent mechanical strength and stiffness in a smaller bulk, typically with a 20 to 60% reduction in circumferential bulk.

According to an additional feature of the invention, the V-shape comprises a first planar wall and a second planar wall, an angle of bending being established between the first planar wall and the second planar wall, the angle of bending being comprised between 0° and 80°, the angle of bending preferably being comprised between 0° and 40°.

The angle of bending according to this last feature makes it possible to minimize the radial bulk of the flexible blade. The magnitude chosen for the angle also makes it possible to adjust the magnitude of the force that the flexible blade exerts on the external periphery of the actuating lever.

According to an additional feature of the invention, the first planar wall and the second planar wall are parallel to the axis of actuation.

According to an additional feature of the invention, a curved wall connects the first planar wall and the second planar wall.

According to an additional feature of the invention, the curved wall has a radius of curvature comprised between 2 mm and 10 mm.

According to an additional feature of the invention, a radius of curvature of the curved wall, a thickness of the flexible blade and a ratio of the radius of curvature to the thickness of the flexible blade are established, the ratio being comprised between 2 and 8.

The curved wall as defined according to these last three features allows the stiffness of the flexible blade to be adapted to suit, while limiting the mechanical stress concentrations in this blade.

According to an additional feature of the invention, the flexible blade is made as a single piece from a strip of metal, notably sheet steel.

Thus, the manufacturing process is simple and economical: starting from a sheet of constant thickness, typically comprised between 0.5 and 2 mm, a cutting-out operation, for example a press-cutting operation, is performed in order to cut out the exterior and interior contours of the flexible blade, and this is then followed by a bending operation in order to give it the V-shape.

According to an additional feature of the invention, the flexible blade is manufactured from a metal that has undergone a hardening treatment, notably a carbonitriding, a nitriding, a case-hardening carburizing or a quench-hardening treatment.

This feature makes it possible to increase the mechanical strength of the flexible blade required to withstand the mechanical stresses transmitted to the blocking mechanism.

According to an additional feature of the invention, the positioning member comprises an elastic device which collaborates with a rolling element, said rolling element collaborating with the external periphery of the actuating lever.

According to an additional feature of the invention, the elastic device has a stiffness comprised between 10 and 50 N/mm.

According to an additional feature of the invention, the elastic device executes a radial movement when the positioning member collaborates with the external periphery of the actuating lever, the radial movement varying between 1 and 10 mm irrespective of the angular position of the actuating lever.

According to another embodiment of the invention, the positioning member is a spring-loaded pusher, the spring-loaded pusher comprising a helical spring applying a force to a ball, said ball collaborating with the external periphery of the actuating lever.

According to another embodiment of the invention, the actuating lever is directly or indirectly made to rotate by a rotor shaft of an electric motor.

According to another of its aspects, the invention also relates to a transmission system comprising a shaft having at least one locking recess and a blocking mechanism as defined above.

The invention further relates to a motor vehicle comprising a transmission system as defined above.

DESCRIPTION OF THE EMBODIMENTS

Throughout the figures, elements that are identical or perform the same function bear the same reference numbers. The following embodiments are examples. Although the description refers to one or more embodiments, this does not necessarily mean that each reference relates to the same embodiment, or that the features apply only to one embodiment. Individual features of different embodiments can also be combined or interchanged in order to provide other embodiments.

A mechanism for rotationally blocking a shaft of a vehicle comprises in particular: a mobile pawl, a pushing device, an actuating lever and a positioning member. The blocking mechanism is notably intended to immobilize a vehicle, for example a car, when parked. The various elements of an embodiment of the blocking mechanism are set out below.

Figure 1:
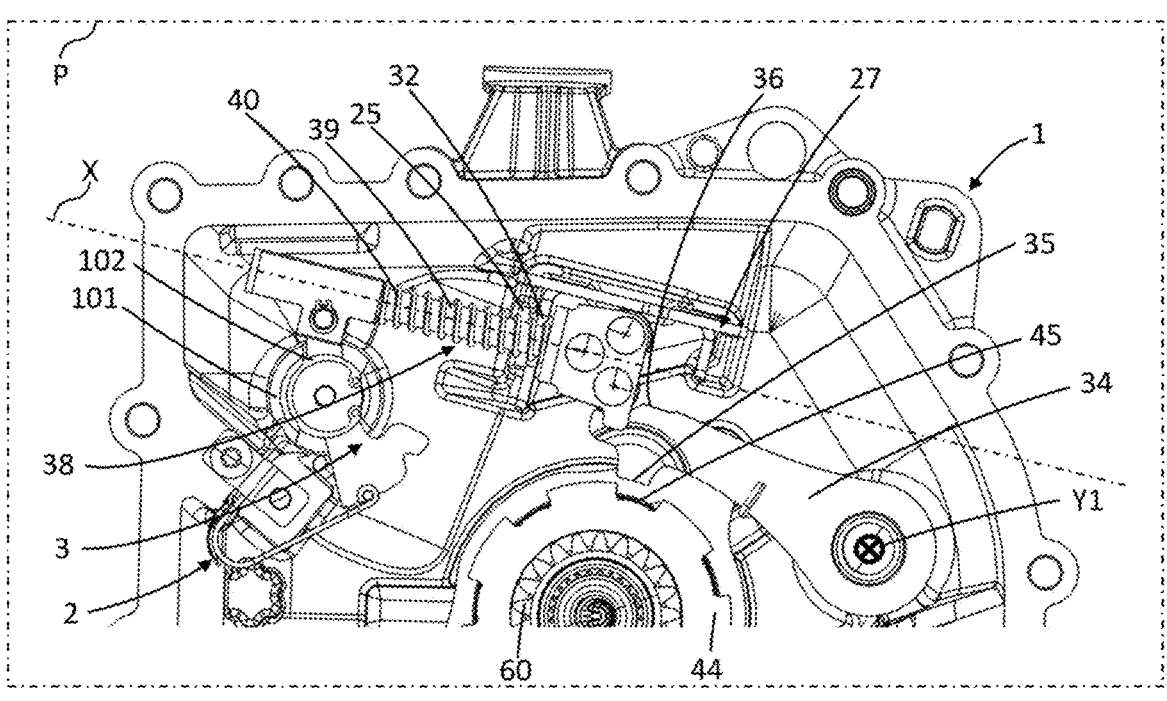
FIG. 1 is a face-on view of a blocking mechanism according to one embodiment of the invention.
Figure 2:
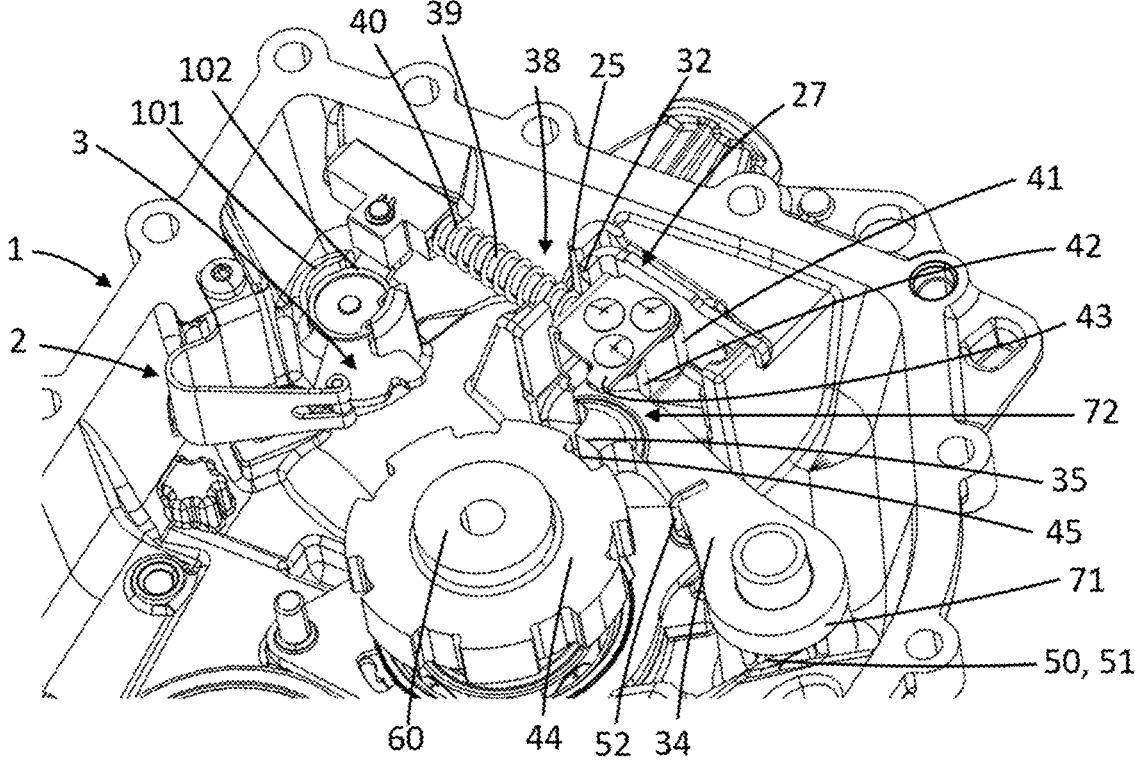
FIG. 2 is a perspective view of FIG. 1.

FIGS. 1 and 2 illustrate a blocking mechanism according to one embodiment of the invention. In these figures, the blocking mechanism comprises a mobile pawl 34 situated in a transmission casing 1 (partially depicted). The mobile pawl 34 may have an elongate shape and may have a first end 71 and a second end 72 at a distance from the first end 71.

The first end 71 for example enables the mobile pawl 34 to be fixed to the transmission casing 1 while allowing the rotational movement of said mobile pawl 34. In other words, the mobile pawl is mounted with the ability to pivot in a plane P about an axis of pivoting Y1.

The second end 72 may comprise a cam surface 36 located on a first lateral face of the mobile pawl 34. The second end 72 may further comprise a locking finger 35 projecting from a second lateral face of the mobile pawl 34. The locking finger 35 is intended, when the blocking mechanism is triggered, to become inserted in a locking recess 45. The locking recess 45 is for example located on a ratchet wheel 44 which is capable of receiving said locking finger 35, and which is secured to, in order to rotate as one with, the transmission shaft 60 (partially depicted) that is to be rotationally blocked.

Thus, the blocking mechanism varies between a locking position in which the locking finger 35 is engaged in the locking recess 45 and a release position in which the locking finger 35 is disengaged from said locking recess 45. In FIGS. 1 and 2, the mechanism for rotationally blocking a shaft is depicted in a release position.

The mobile pawl 34 may further comprise a torsion spring 50. The torsion spring 50 is for example wound at the first end 71 of the mobile pawl 34. The torsion spring 50 may comprise a first end 51 which bears against a bearing surface of the transmission casing 1 and a second end 52 which bears against a bearing surface of the mobile pawl 34. The torsion spring 50 is arranged so as to exert a return force on the mobile pawl 34 so as to return same towards the release position.

The blocking mechanism further comprises a pushing device 38. The pushing device 38 may be guided in a longitudinal direction X by a guide rail 27 housed in the transmission casing 1. In the cases where the pushing device 38 is pushed back by the mobile pawl 34 in dynamic phases, the pushing device 38 may come into abutment against a lateral wall of the guide rail 27, which thus forms a non-return stop for the pushing device 38. The pushing device 38 is in this case pushed against the mobile pawl 34 by a return force exerted by a traction spring 40. This effect may for example be produced when engagement is attempted at excessively high speed. Beyond a threshold speed, for example between 3 km/h and 5 km/h, the mobile pawl 34 springs back so as to prevent engagement, and the pushing device 38 is thus pushed back into abutment. The spring 40 surrounds a rod 39 of the pushing device which extends through a first notch 25 of the transmission casing 1 and a second notch 32 of the guide rail 27.

The pushing device 38 may take the form of a mobile carriage that for example comprises a first mobile roller 41 that is able to move along a longitudinal wall 30 of the guide rail 27. The pushing device 38 may further comprise a cam follower 42 including a second mobile roller which is in contact with the cam surface 36 of the mobile pawl 34 and capable of moving along this cam surface 36.

The pushing device 38 may further comprise a lug 43 located at the second end of the mobile pawl 34. The lug 43 is intended to keep the mobile pawl 34 in the plane P.

In order to move the mobile pawl 34 into the locking position, the rod 39 may be moved through the second notch 32 in the guide rail 27 thus moving the pushing device 38 in the longitudinal direction X. The movement of the pushing device 38 may cause the first mobile roller 41 to move along the guide rail 27 and the cam follower 42 to move along the cam surface 36 of the mobile pawl 34. The cam surface 36 may have a slope and the movement of the pushing device 38 may thus exert pressure towards the cam surface 36 of the mobile pawl 34. This pressure may cause a rotational movement of the second end of the mobile pawl 34 towards a locking recess in such a way that the locking finger 35 may become engaged in a locking recess present for example on a ratchet 44.

FIGS. 3 to 7 more particularly illustrate an actuating lever 3 and a positioning member 2 of the blocking mechanism according to one embodiment of the invention.

The actuating lever 3 is mounted on the transmission casing 1 with the ability to pivot about an axis of actuation Y2. A housing 101 (visible in FIG. 2) formed in the transmission casing 1 may collaborate with a retaining ring 102 in order to block the actuating lever 3 axially. The actuating lever 3 may be made to rotate by a drive shaft 303, the drive shaft 303 collaborating in terms of rotation with a rotary shaft of an electric motor, notably via gearing enabling a speed reduction to be achieved. The actuating lever 3 may be connected to the rod 39, for example via a pivot connection, so that a rotation of the actuating lever 3 about the axis of actuation Y2 causes a translational movement of the pushing device 38 in the longitudinal direction X.

Figure 7:
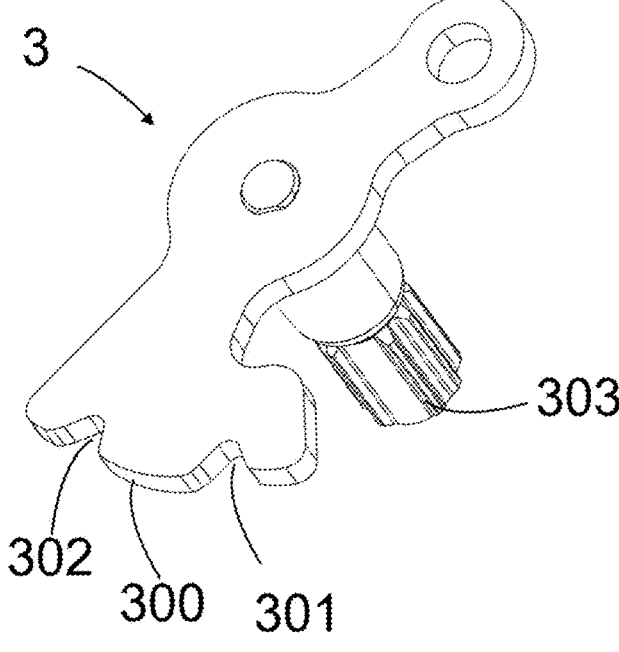
FIG. 7 is a perspective view of an actuating lever according to one embodiment of the invention.

As illustrated in FIG. 7, the actuating lever 3 further comprises an external periphery 300 including a first angular-positioning notch 301 and a second angular-positioning notch 302. The actuating lever 3 may be formed from a plate cut from a sheet of constant thickness, for example of a thickness comprised between 3 and 6 mm, the external periphery 300 being obtained from a cut edge face of the plate.

Figure 3:
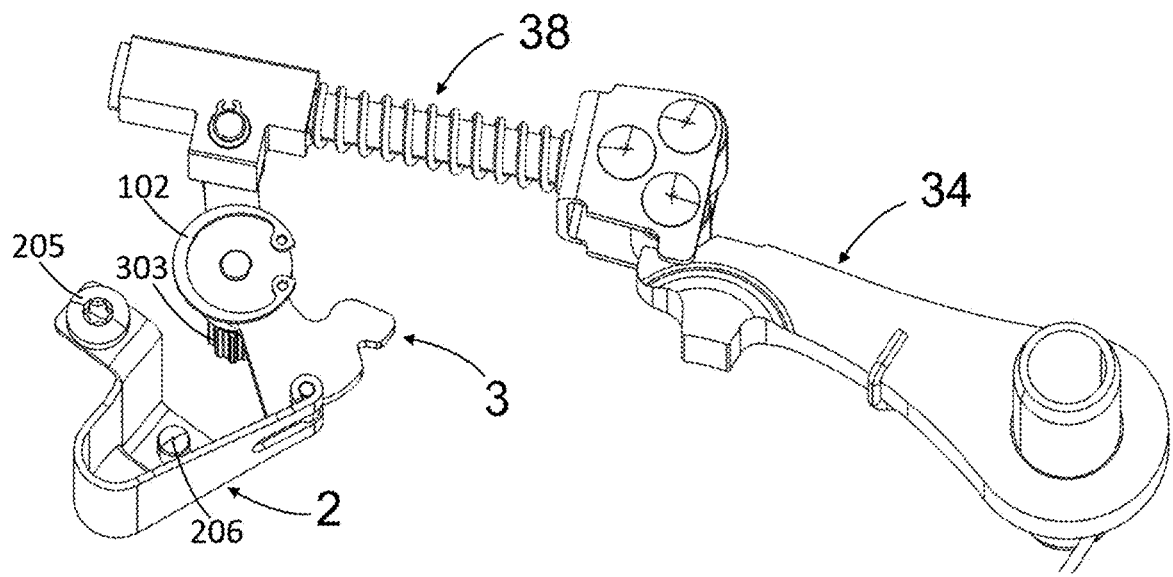
FIG. 3 is a perspective view of part of the blocking mechanism according to one embodiment of the invention.
Figure 5:
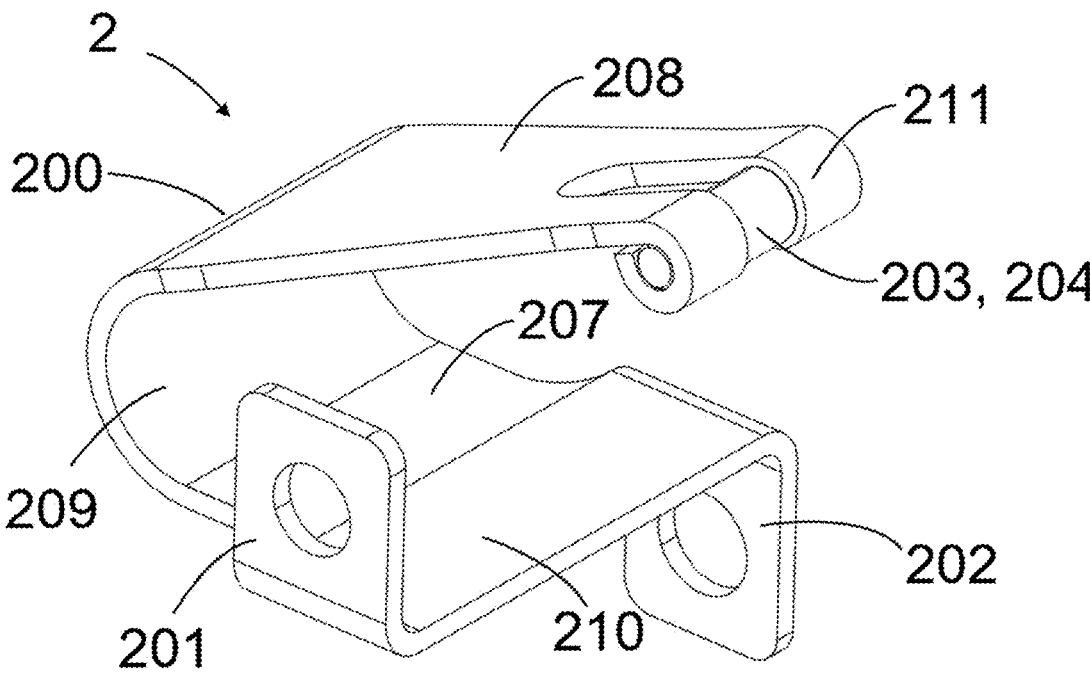
FIG. 5 is a perspective view of a positioning member according to one embodiment of the invention.

As illustrated in FIGS. 3 and 5, the positioning member 2 collaborates with the external periphery of the actuating lever 3, the positioning member 2 includes a bearing surface 204 configured to engage in the first angular-positioning notch 301 when the mobile pawl 34 is in the locking position and in the second angular-positioning notch 302 when the mobile pawl 34 is in the release position. The positioning member 2 thus enables the position of the blocking mechanism to be maintained stably and precisely in the release position and/or in the locking position.

In this embodiment, the positioning member 2 may comprise a flexible blade 200 directly or indirectly applying force to the external periphery 300 of the actuating lever 3. A rolling element 203, for example a cylindrical roller, arranged on the flexible blade 200, may be configured to roll along the external periphery 300 of the actuating lever 3.

The positioning member 2 is fixed to the transmission casing 1 via a first fixing surface 201 and via a second fixing surface 202, the first fixing surface 201 and the second fixing surface 202 being offset from one another in a direction parallel to the axis of actuation Y2. As in the embodiments depicted in FIGS. 3 to 6, the first fixing surface 201 and the second fixing surface 202 may be planar and substantially perpendicular to the axis of actuation Y2. Advantageously, the first fixing surface 201 and the second fixing surface 202 may be produced in the form of a first bent tab 201 and of a second bent tab 202, the first and second bent tabs being bent at an angle of 90° from a first portion 210 of the flexible blade 200 and positioned axially one on each side of said first portion 210 of the flexible blade 200. The first bent tab 201 may be bent in an opposite direction to the second bent tab 202.

Figure 4:
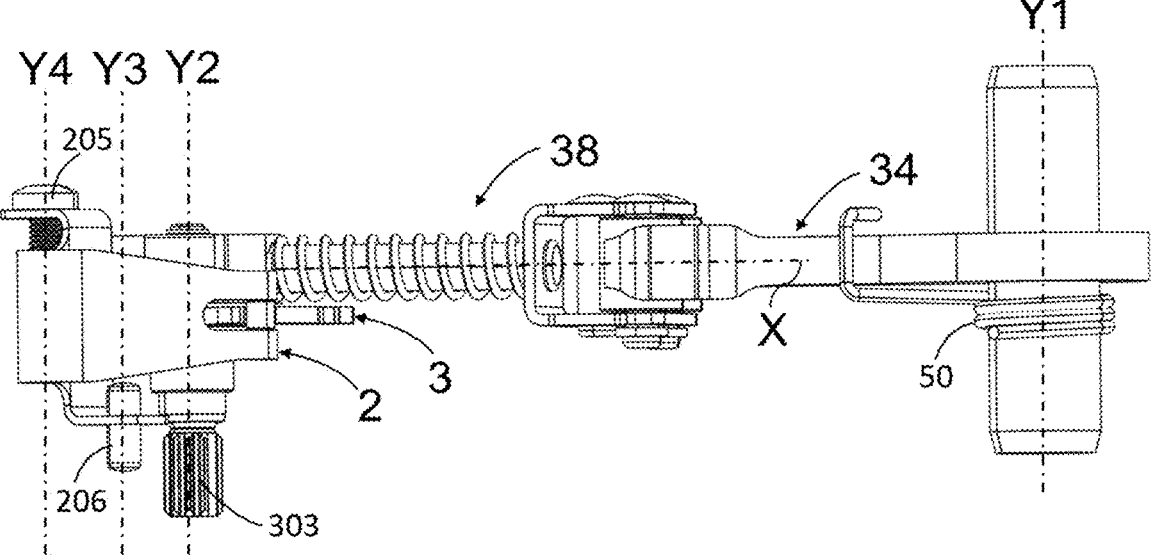
FIG. 4 is a view of FIG. 3, from above.

As illustrated in FIGS. 3 and 4, a first fixing means 206, in this instance a centring pin, may collaborate with a circular hole in the first bent tab 201 in order to limit the movement of the positioning member 2 with respect to the transmission casing 1 in the plane P perpendicular to the axis of actuation Y2. Advantageously, a very small first diametral clearance, typically comprised between 0.05 mm and 0.2 mm, is formed between the circular hole and the centring pin. A second fixing means 205, in this instance a screw, may collaborate with the second bent tab 202 to block the movement of the positioning member 2 with respect to the transmission casing 1 along a fourth axis Y4 parallel to the axis of actuation Y2.

As illustrated in FIG. 4, four axes may be defined for assembling on the transmission casing 1: the axis of actuation Y2 of the actuating lever 3, the axis of pivoting Y1 of the mobile pawl 34, the fourth axis Y4 along which the screw 205 can be assembled, and a third axis Y3 along which the centring pin 206 can be assembled. Advantageously, these four axes may be parallel, thereby enabling all these components to be mounted easily during the one same assembly operation.

Figure 6:
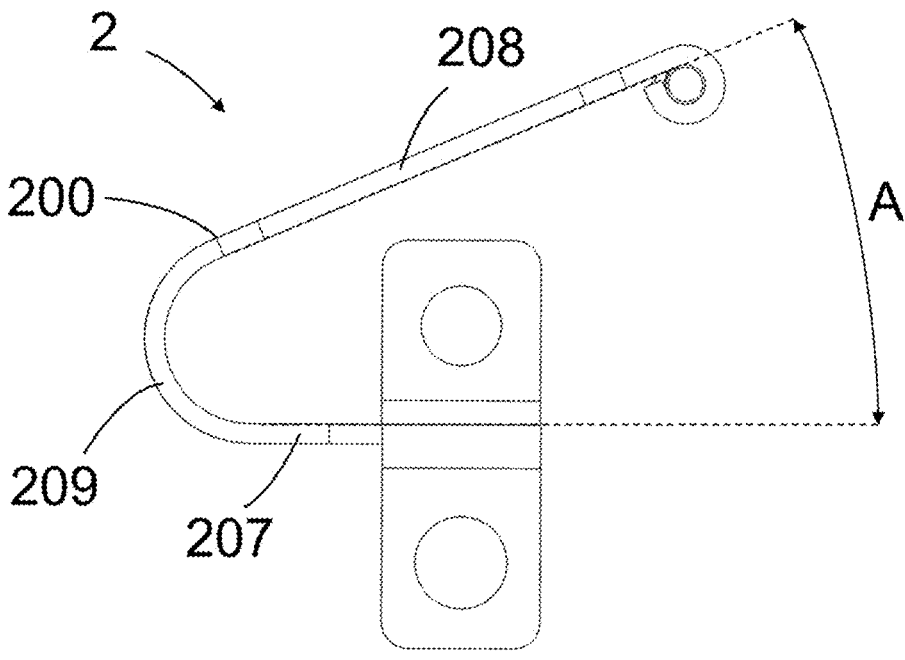
FIG. 6 is a face-on view of FIG. 5.

As illustrated in FIGS. 5 and 6, the flexible blade 200 may have a shape that is bent over on itself to form a V-shape. The V-shape may comprise a first planar wall 207 and a second planar wall 208, an angle of bending A being established between the first planar wall 207 and the second planar wall 208, the angle of bending A preferably being comprised between 0° and 40°, and being 30° in the example of FIG. 6. A curved wall 209 may connect the first planar wall 207 and the second planar wall 208, the curved wall 209 having a radius of curvature comprised between 2 mm and 10 mm, and of 6.5 mm in the example of FIG. 6. Advantageously, the radius of curvature of the curved wall 209 may be chosen according to the thickness of the flexible blade 200 so as to improve the trade-off between the stiffness and the mechanical strength thereof. A ratio of the radius of curvature to the thickness of the flexible blade 200 may be established, the ratio preferably being comprised between 2 and 8. In the example of FIG. 6, the thickness of the flexible blade 200 is 1.5 mm, so the ratio is therefore equal to 4.3.

The flexible blade 200 may be made as a single piece from a strip of metal. In the example of FIG. 6, the flexible blade 200 is made from a piece of steel strip which is press-cut to obtain its contours, then bent to obtain its V-shape, the first and second bent tabs 201 and 202, and also an additional shape 211 enabling the formation of a pivot connection between the cylindrical roller 203 and the flexible blade 200. The flexible blade 200 may then undergo a hardening treatment in order to improve its mechanical integrity.

The first planar wall 207 and the second planar wall 208 of the flexible blade 200 may be parallel to the axis of actuation Y2. In addition, the shape of the flexible blade 200, notably its V-shape and/or the magnitude of the angle of bending A chosen, may be chosen in such a way as to leave unobstructed a passage allowing assembly of the second fixing means 205 along the fourth axis Y4 and of the first fixing means 206 along the third axis Y3.

It must be emphasised that all of the features, as they appear to a person skilled in the art on the basis of the present description, the drawings and the accompanying claims, even if in practice they have been described only in relation to other given features, both individually and according to any combination, may be combined with other features or groups of features disclosed herein, provided that this has not been expressly excluded and that technical circumstances do not make such combinations impossible or pointless.

Use of the verbs "comprise" or "include" and their conjugated forms does not exclude the presence of elements or steps other than those described in a claim.

In the claims, any reference sign between parentheses should not be interpreted as limiting the claim.

The invention claimed is:

1. A blocking mechanism able to be mounted in a transmission casing for rotationally blocking a shaft of a vehicle having at least one locking recess, the blocking mechanism comprising:
   a mobile pawl comprising a locking finger, the mobile pawl being mounted with the ability to pivot about an axis of pivoting between a locking position in which the locking finger is engaged in the locking recess and a release position in which the locking finger is disengaged from said locking recess, the mobile pawl comprising a cam surface;
   a pushing device including a cam follower able to move on the cam surface in order to move the mobile pawl from the release position to the locking position;

an actuating lever mounted with the ability to pivot about an axis of actuation and configured to move the pushing device, the actuating lever comprising an external periphery including a first angular-positioning notch and a second angular-positioning notch; and a positioning member collaborating with the external periphery of the actuating lever, the positioning member including a bearing surface configured to engage in the first angular-positioning notch when the mobile pawl is in the locking position and in the second angular-positioning notch when the mobile pawl is in the release position;

wherein the positioning member comprises a first fixing surface and a second fixing surface, the first fixing surface and the second fixing surface being offset from one another in a direction parallel to the axis of actuation.

2. The blocking mechanism according to claim 1, wherein the axis of actuation of the actuating lever is parallel to the axis of pivoting of the mobile pawl.

3. The blocking mechanism according to claim 2, wherein the first fixing surface and the second fixing surface are substantially perpendicular to the axis of actuation.

4. The blocking mechanism according to claim 2, wherein the external periphery of the actuating lever is made up of surfaces parallel to the axis of actuation.

5. The blocking mechanism according to claim 2, wherein the positioning member comprises a flexible blade directly or indirectly applying force to the external periphery of the actuating lever.

6. The blocking mechanism according to claim 1, wherein the first fixing surface and the second fixing surface are substantially perpendicular to the axis of actuation.

7. The blocking mechanism according to claim 1, wherein the external periphery of the actuating lever is made up of surfaces parallel to the axis of actuation.

8. The blocking mechanism according to claim 1, wherein the positioning member comprises a flexible blade directly or indirectly applying force to the external periphery of the actuating lever.

9. The blocking mechanism according to claim 8, wherein the positioning member comprises a rolling element arranged on the flexible blade, the rolling element being configured to roll along the external periphery of the actuating lever.

10. The blocking mechanism according to claim 9, wherein the first fixing surface and the second fixing surface are produced in the form of a first bent tab and of a second bent tab, the first and second bent tabs being bent at an angle of 90° from a first portion of the flexible blade and positioned axially one on each side of said first portion of the flexible blade.

11. The blocking mechanism according to claim 8, wherein the first fixing surface and the second fixing surface are produced in the form of a first bent tab and of a second bent tab, the first and second bent tabs being bent at an angle of 90° from a first portion of the flexible blade and positioned axially one on each side of said first portion of the flexible blade.

12. The blocking mechanism according to claim 11, wherein the first bent tab is bent in an opposite direction to the second bent tab.

13. The blocking mechanism according to claim 8, wherein the flexible blade has a shape that is bent over on itself to form a V-shape.

14. The blocking mechanism according to claim 13, wherein the V-shape comprises a first planar wall and a second planar wall, an angle of bending being established between the first planar wall and the second planar wall, the angle of bending being comprised between 0° and 80°.

15. The blocking mechanism according to claim 14, wherein a curved wall connects the first planar wall and the second planar wall.

16. The blocking mechanism according to claim 14, wherein the first planar wall and the second planar wall are parallel to the axis of actuation.

17. The blocking mechanism according to claim 1, wherein:

a first fixing means collaborates with the first fixing surface in order to limit the movement of the positioning member in a plane perpendicular to the axis of actuation; and a second fixing means collaborates with the second fixing surface to block the movement of the positioning member along an axis parallel to the axis of actuation.

18. The blocking mechanism according to claim 17, wherein the flexible blade has a shape configured to leave unobstructed a passage along an axis parallel to the axis of actuation to allow the first and second fixing means to be assembled.

19. A transmission system comprising a shaft having at least one locking recess and a blocking mechanism according to claim 1.

20. A blocking mechanism able to be mounted in a transmission casing for rotationally blocking a shaft of a vehicle having at least one locking recess, the blocking mechanism comprising:

a mobile pawl comprising a locking finger, the mobile pawl being mounted with the ability to pivot about an axis of pivoting between a locking position in which the locking finger is engaged in the locking recess and a release position in which the locking finger is disengaged from said locking recess, the mobile pawl comprising a cam surface;

a pushing device including a cam follower able to move on the cam surface in order to move the mobile pawl from the release position to the locking position;

an actuating lever mounted with the ability to pivot about an axis of actuation and configured to move the pushing device, the actuating lever comprising an external periphery including a first angular-positioning notch and a second angular-positioning notch; and a positioning member collaborating with the external periphery of the actuating lever, the positioning member including a bearing surface configured to engage in the first angular-positioning notch when the mobile pawl is in the locking position and in the second angular-positioning notch when the mobile pawl is in the release position;

wherein the positioning member comprises a first fixing surface and a second fixing surface, the first fixing surface and the second fixing surface being offset from one another in a direction parallel to the axis of actuation, and wherein:

a first fixing means collaborates with the first fixing surface in order to limit the movement of the positioning member in a plane perpendicular to the axis of actuation; and a second fixing means collaborates with the second fixing surface to block the movement of the positioning member along an axis parallel to the axis of actuation.

* * * * *